(12) United States Patent
Kimbel

(10) Patent No.: US 11,811,444 B1
(45) Date of Patent: Nov. 7, 2023

(54) UNIVERSAL FLOTATION DEVICES FOR PORTABLE PHONE

(71) Applicant: Rebecca Kimbel, Titusville, FL (US)

(72) Inventor: Rebecca Kimbel, Titusville, FL (US)

( * ) Notice: Subject to any disclaimer, the term of this patent is extended or adjusted under 35 U.S.C. 154(b) by 0 days.

(21) Appl. No.: 17/226,363

(22) Filed: Apr. 9, 2021

Related U.S. Application Data

(60) Provisional application No. 63/008,071, filed on Apr. 10, 2020.

(51) Int. Cl.
*H04B 1/3888* (2015.01)
*B63B 22/24* (2006.01)
*B63B 22/04* (2006.01)

(52) U.S. Cl.
CPC .......... *H04B 1/3888* (2013.01); *B63B 22/04* (2013.01); *B63B 22/24* (2013.01)

(58) Field of Classification Search
CPC ..................................... H04B 1/3888
USPC ............................ 206/320; 441/1, 28, 29, 32
See application file for complete search history.

(56) References Cited

U.S. PATENT DOCUMENTS

| | | | | |
|---|---|---|---|---|
| 3,116,498 A * | 1/1964 | Larson | ................ | F16B 13/0808 441/1 |
| 3,132,626 A * | 5/1964 | Reid | ........................ | G08B 5/06 441/32 |
| 4,034,851 A * | 7/1977 | Barksdale | ................ | A47K 5/04 510/438 |
| 4,312,089 A * | 1/1982 | Taylor | ..................... | B63B 22/00 441/32 |
| 5,820,431 A * | 10/1998 | Biesecker | ................. | B63C 9/23 441/106 |
| 6,533,151 B1 * | 3/2003 | Link | ......................... | A45F 5/00 248/312.1 |
| 2003/0052035 A1 * | 3/2003 | Dickinson | ............... | G09F 23/00 383/3 |
| 2003/0077958 A1 * | 4/2003 | Powell | ...................... | A45F 5/02 441/1 |
| 2003/0124922 A1 * | 7/2003 | Sowry | .................... | B25G 1/102 441/136 |
| 2004/0009721 A1 * | 1/2004 | Stoelinga | ................ | B63B 22/08 441/7 |
| 2007/0135001 A1 * | 6/2007 | Mickelson | ............ | B63B 22/166 441/6 |
| 2009/0093177 A1 * | 4/2009 | Reed | ....................... | B63B 22/24 441/23 |

(Continued)

Primary Examiner — Jacob K Ackun
(74) Attorney, Agent, or Firm — Brian S. Steinberger; Hilary F. Steinberger; Law Offices of Brian S. Steinberger, P.A.

(57) ABSTRACT

Devices, buoys, kits, systems and methods for preventing small objects, such as but not limited to portable phones, money and keys from sinking in the water. A foam block buoy molded about a t-shaped plastic insert with an eyelet in a stem extending therefrom for attaching to a tether line. A phone foldable ring stand can be included with a peel and stick backing for being attached to a portable phone, that is attachable to the end of the tether line, wherein the float prevents the portable phone from sinking and becoming lost in water. A dry bag can be included to also be attachable to the tether line for keeping items from becoming wet and damaged. Additionally, a battery powered fishing lure, can be attached to the float or the line to allow the float buoy to be found in the dark.

16 Claims, 15 Drawing Sheets

(56) References Cited

U.S. PATENT DOCUMENTS

| | | | | |
|---|---|---|---|---|
| 2012/0043235 A1* | 2/2012 | Klement | ................ | A45C 11/00 |
| | | | | 206/320 |
| 2012/0315813 A1* | 12/2012 | Rossini | .................. | B63B 22/00 |
| | | | | 441/75 |
| 2013/0043144 A1* | 2/2013 | McDonald | ............. | A45C 11/00 |
| | | | | 206/37 |
| 2014/0273678 A1* | 9/2014 | Meyer | ....................... | B63C 9/18 |
| | | | | 441/31 |
| 2016/0374437 A1* | 12/2016 | King | ...................... | B63B 21/20 |
| | | | | 441/9 |

\* cited by examiner

UNIVERSAL FLOTATION DEVICES FOR PORTABLE PHONE

CROSS REFERENCE TO RELATED APPLICATIONS

This application claims the benefit of priority to U.S. Provisional Application Ser. No. 63/008,071 filed Apr. 10, 2020. The entire disclosure of each of the applications listed in this paragraph are incorporated herein by specific reference thereto.

FIELD OF INVENTION

This invention relates to floatation devices and in particular to devices, systems, floats and methods for keeping objects such as a portable phone and keys, from sinking in the water.

BACKGROUND AND PRIOR ART

Portable phones, such as smart phones are popular to carry. However, a problem with using these phones over water is if the phone falls into the water it is not easily recoverable. This problem is compounded when the user is over water for long periods of time such as for fisherman.

Large phone cases may make the portable phone waterproof, but that does not prevent the problem of the phone sinking and not being recoverable.

Thus, the need exists for preventing portable phones such as smart phones from sinking in water.

SUMMARY OF THE INVENTION

A primary objective of the present invention is to provide devices, systems, floats, kits and methods for keeping a portable portable phone from sinking in the water.

A secondary objective of the invention is to provide devices, systems, floats, kits and methods for keeping objects, such as but not limited to portable phones, keys, money, licenses and/or small tools from sinking in the water.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Figure 1A:
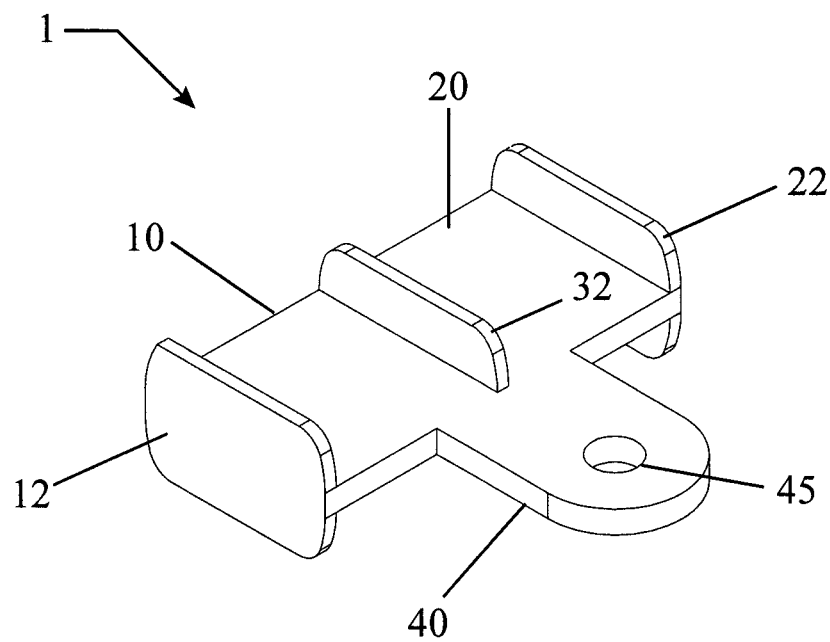
FIG. 1A is an upper front perspective view of the plastic insert

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of components will now be described.

Figure 1B:
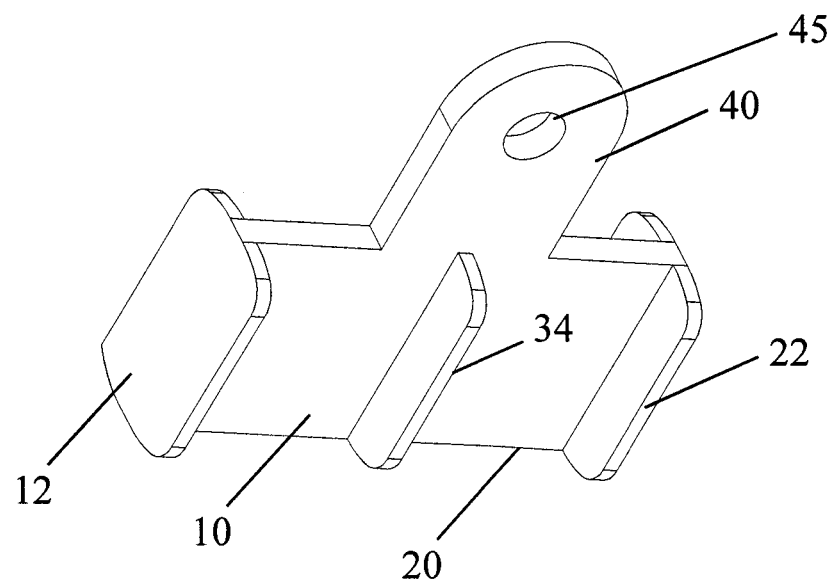
FIG. 1B is a lower front perspective view of the plastic insert of FIG. 1A.
Figure 1C:
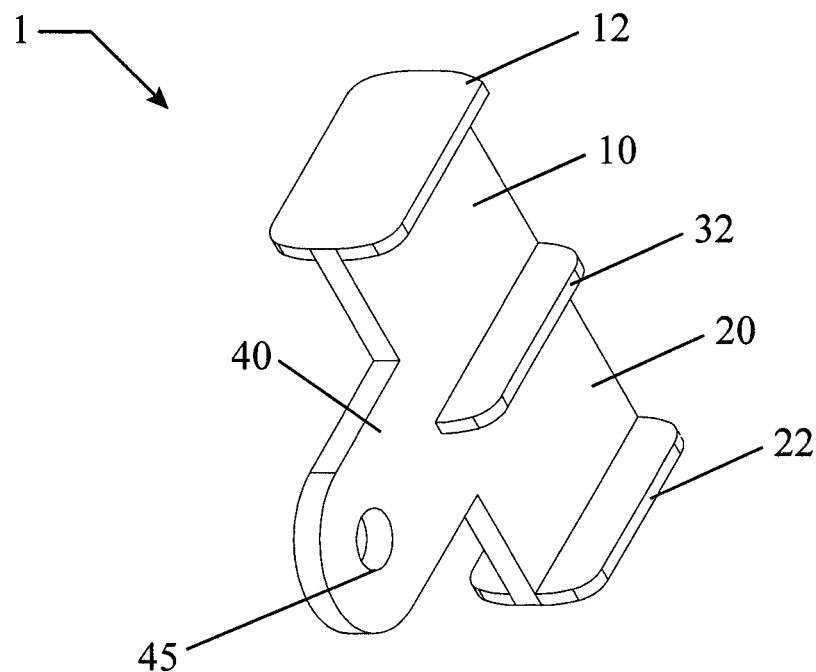
FIG. 1C is another lower front perspective view of the insert of FIG. 1B.
Figure 1D:
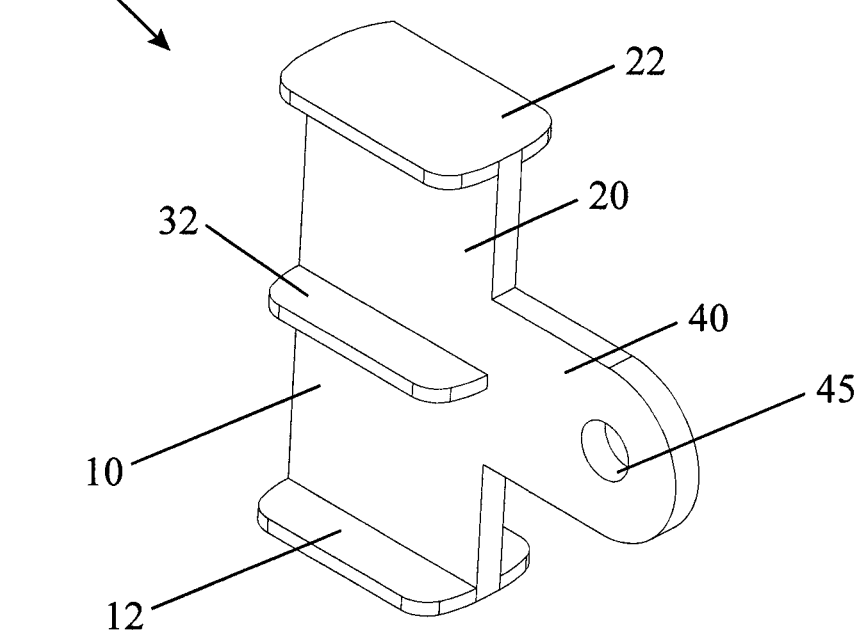
FIG. 1D is another lower front perspective view of the insert of FIG. 1B and FIG. 1C.

1 T shaped plastic insert
10 left wing
12 left ends of upwardly and downwardly extending edges
20 right wing
22 right ends of upwardly and downwardly extending edges
32 middle upward flange
34 middle downward flange
40 stem
45 eyelet
50 molded EVA foam float with T shaped insert 1 inside
70 light
100 phone ring holder foldable ring kickstand
102 ring
105 hinge
108 front disc
110 backing with peel and stick layer
120 tether cord, line, wire
150 hanger
154 latch
155 hinge
158 hook end
200 portable phone
300 keys
400 fishing pliers
500 dry bag
510 removable top cover
600 wallet/billfold
610 cards, such as credit cards, identification cards, licenses
620 money, such as paper money, coins FIG. 1A is an upper front perspective view of the plastic insert 1. FIG. 1B is a lower front perspective view of the plastic insert 1 of FIG. 1A. FIG. 1C is another lower front perspective view of the insert 1 of FIG. 1B. FIG. 1D is another lower front perspective view of the insert 1 of FIG. 1B and FIG. 1C.

Referring to FIGS. 1A-1D, the plastic insert 1, can be t-shaped and formed from ABS (Acylonitrile butadiene styrene) plastic The t shaped insert 1 can have a left wing 10 with left ends 12 having upwardly and downwardly extending edges, and a right wing 20 with right ends 22 having upwardly and downwardly extending edges.

A upward flange 32 can extend from a middle portion between the left wing 10 and right wing 20. A downwardly flange can extend downward from the middle portion between the left wing 10 and right wing 20.

A stem 40 can extend sideways from the middle portion between left wing 10 and right wing 20. An eyelet 45 can be molded into the rounded end of the stem 40.

Figure 2A:
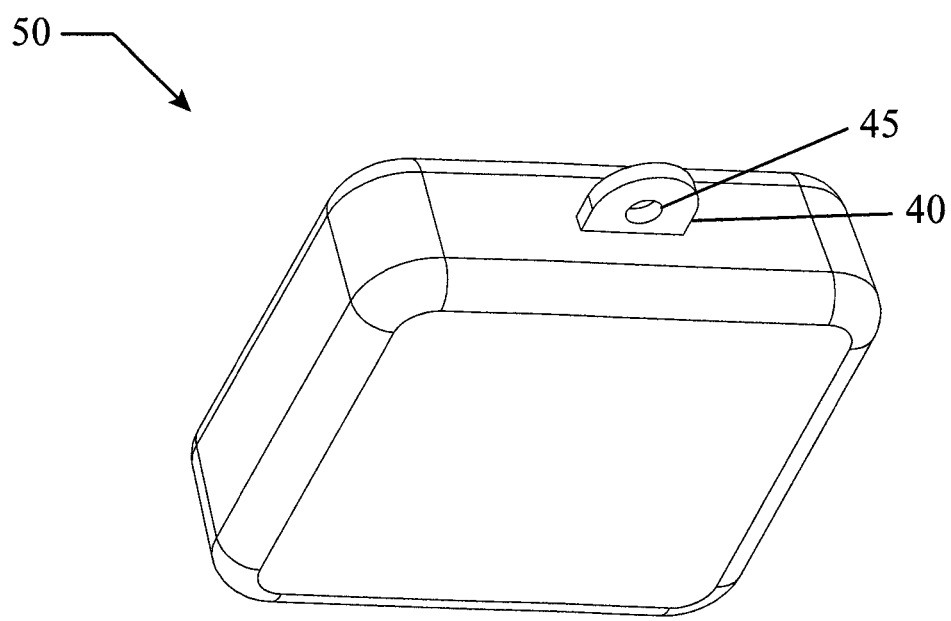
FIG. 2A is a lower front perspective view of a molded float with the plastic insert of FIGS. 1A-1D molded inside with the stem and eyelet extending out.

FIG. 2A is a lower front perspective view of a molded float 50 with the plastic insert 1 of FIGS. 1A-1D molded inside with the stem 40 and eyelet 45 extending out.

Figure 2B:
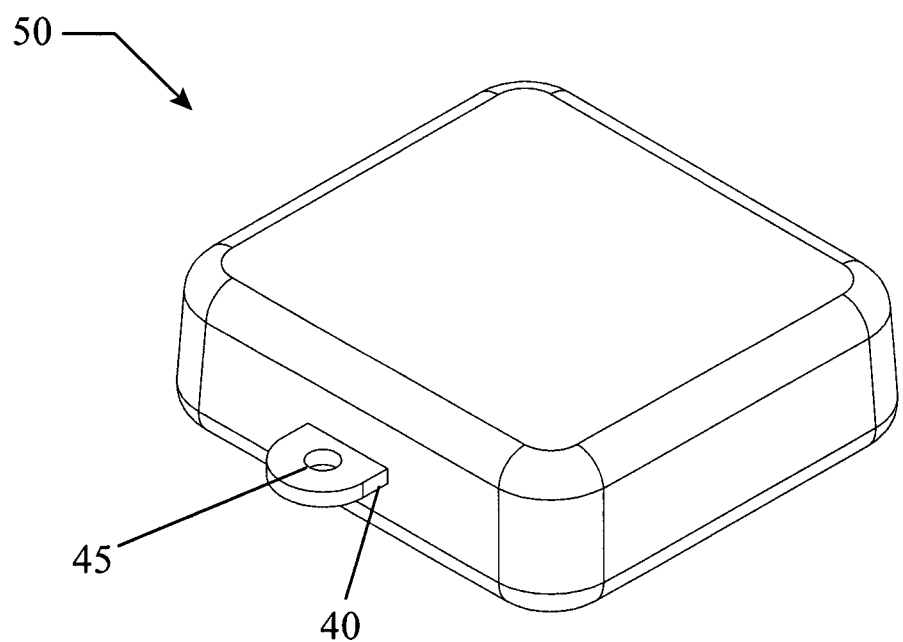
FIG. 2B is an upper front perspective view of the molded float with the plastic insert molded inside and the stem with eyelet extending from a side of the float shown in FIG. 2A.

FIG. 2B is an upper front perspective view of the molded float 50 with the plastic insert 1 molded inside and the stem 40 with eyelet 45 extending from a side of the float 50 shown in FIG. 2A.

Referring to FIGS. 2A-2B, the universal floatation device can include a buoy float 50 formed from a block of foam plastic, such as but not limited to an EVA (Ethylene-Vinyl Acetate) closed cell foam block that can include dimensions of approximately 3.5" by approximately 3.75" by approximately 1.25".

Inside of the buoy float can be a solid insert 1 having a protruding eyelet portion 30, 45. The insert can be molded inside of the foam block for strength.

Figure 3A:
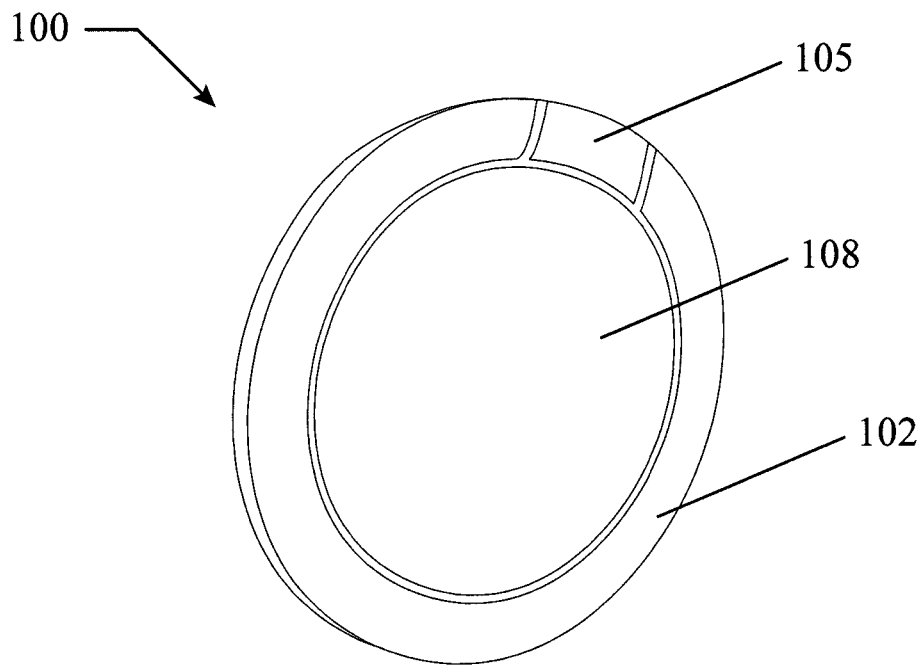
FIG. 3A is a front perspective view of the peel and stick disc with foldable ring kickstand.
Figure 3B:
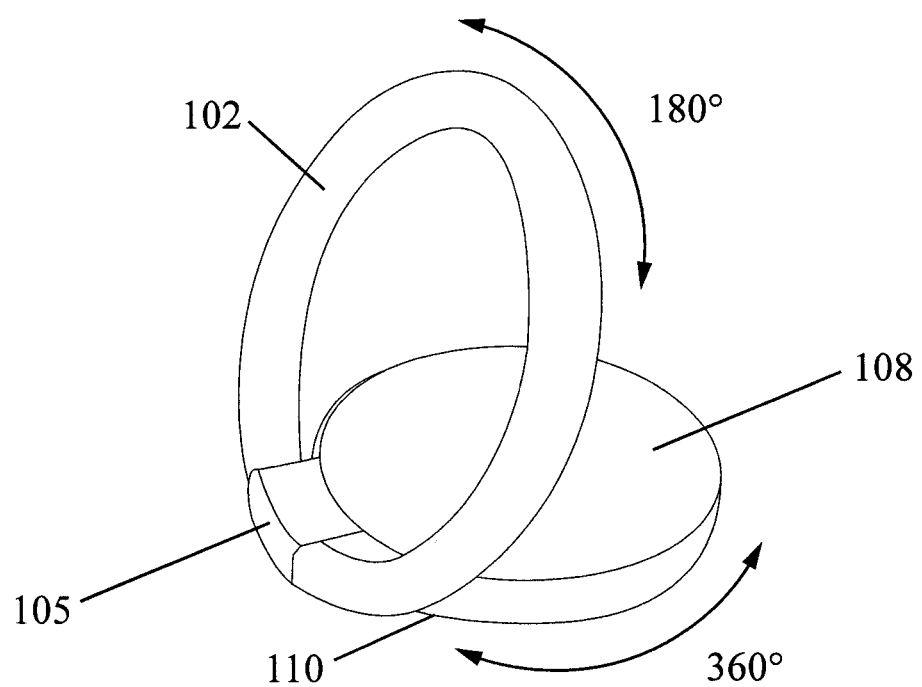
FIG. 3B is another perspective view of the phone ring holder with foldable ring kickstand of FIG. 3A with ring folded out.
Figure 3C:
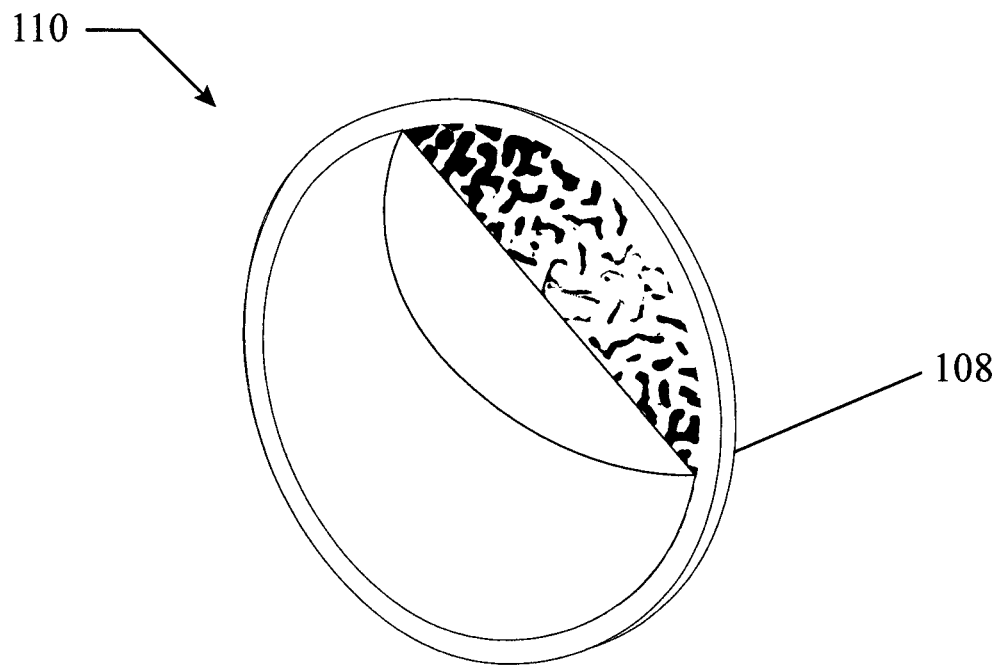
FIG. 3C is a rear view of the phone ring holder with foldable ring kickstand of FIG. 3A with backing being peeled off.

FIG. 3A is a front perspective view of a phone ring holder with foldable ring kickstand 100 FIG. 3B is another perspective view of the phone ring holder with foldable ring kickstand 100 of FIG. 3A with ring 102 folded out. FIG. 3C is a rear view of the phone ring holder with foldable ring kickstand 100 of FIG. 3A with backing 110 being peeled off.

Referring to FIGS. 3A-3C, the phone ring holder with foldable ring kickstand 100 can include a metal front disc 108 with hinge 105 that allows a ring 102 to rotate from a folded position to a folded out position, where the hinge 105 can rotate 360 degrees about the metal disc 108. The backing 110 can be peeled off to expose and adhesive backing on the disc 108.

Figure 4:
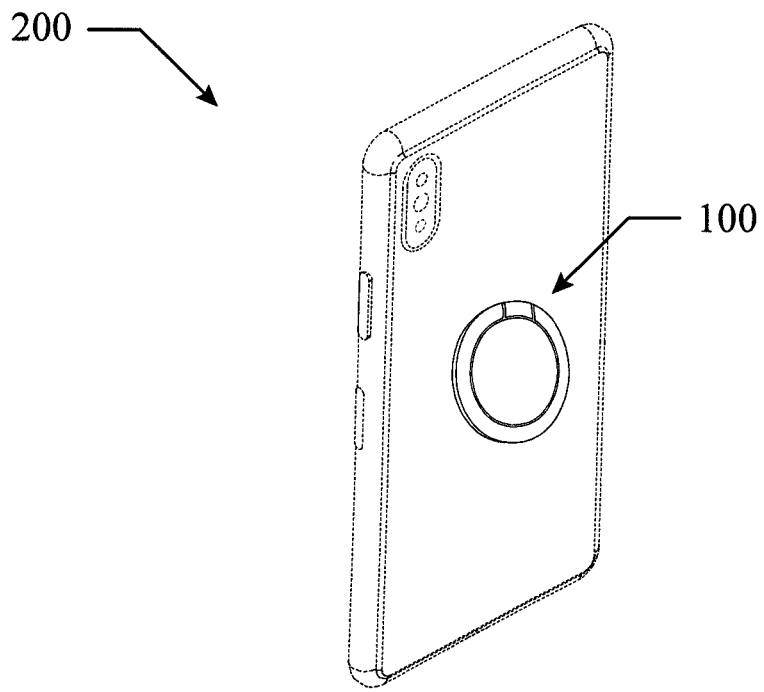
FIG. 4 is a perspective view of a portable/mobile phone 20 with the phone ring holder with foldable ring kickstand of FIGS. 3A-3C adhered to the back of the phone.

FIG. 4 is a perspective view of a portable/mobile phone 200 with the phone ring holder with foldable ring kickstand 100 of FIGS. 3A-3C adhered to the back of the phone 200.

Figure 5A:
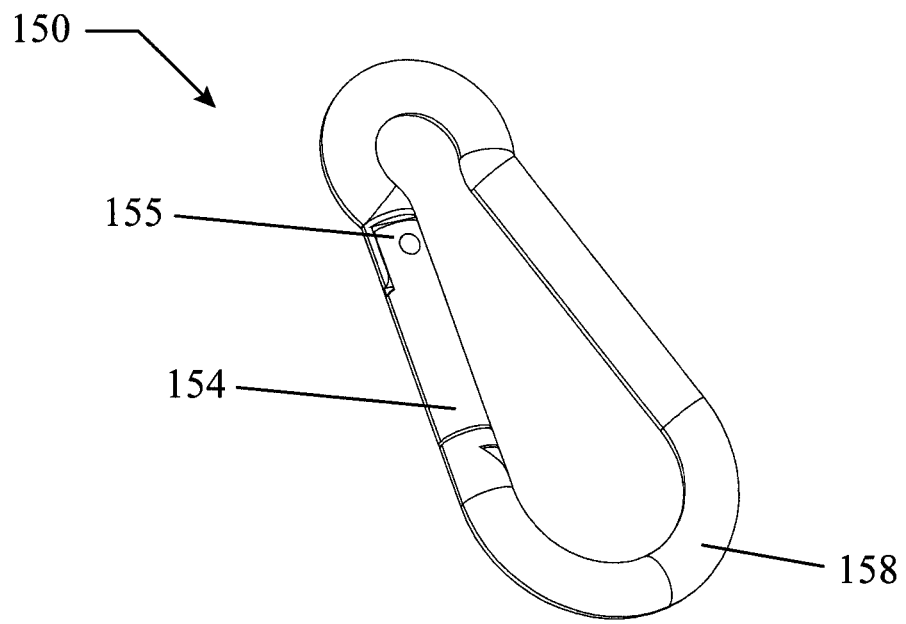
FIG. 5A is a perspective view of a hanger with latch closed for the hook end.
Figure 5B:
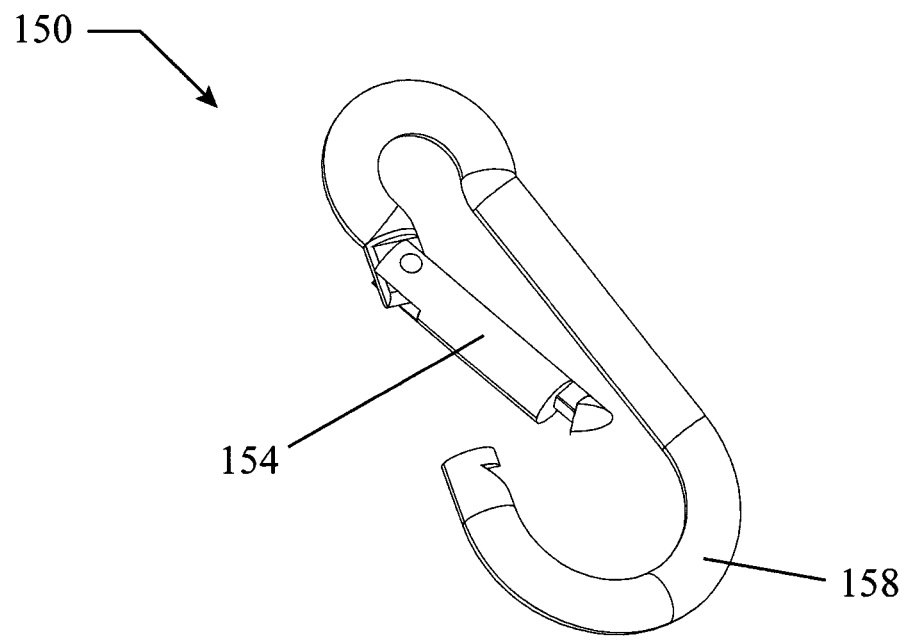
FIG. 5B is another perspective view of the hanger of FIG. 5A with latch bent open to expose hook end.

FIG. 5A is a perspective view of a metal hanger with latch closed for the hook end. FIG. 5B is another perspective view of the hanger of FIG. 5A with latch bent open to expose hook end.

Referring to FIGS. 5A-5B, the hanger 150 can have an elongated shape with convex curved ends having a latch 154 that rotates along a hinge 155 to open and close off a hook end 158.

Figure 6:
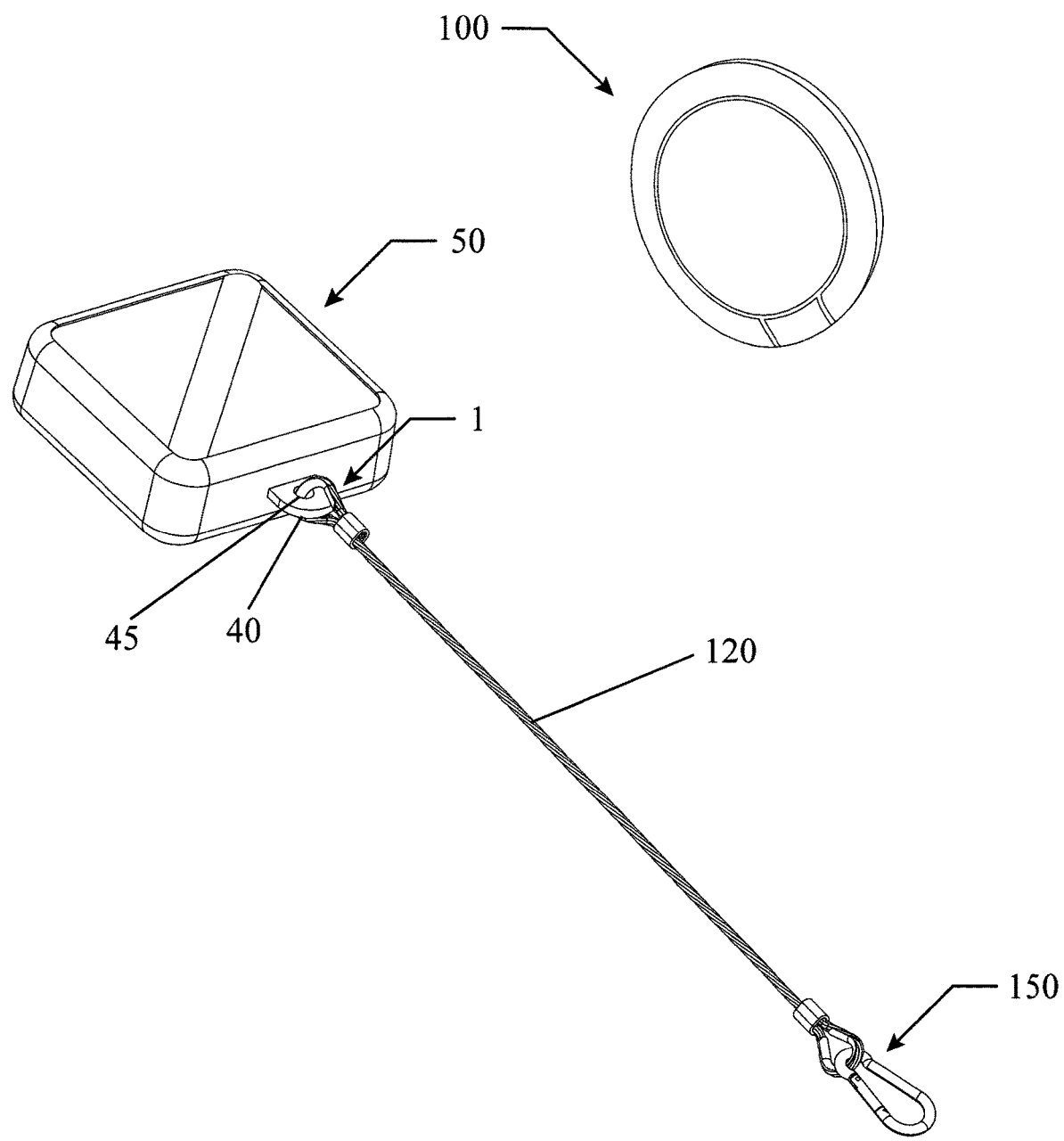
FIG. 6 is an exploded view of the float molded float with the plastic insert of FIGS. 2A-2B attached to a tether line with separate peel and foldable ring phone kickstand of FIG. 3A, which can be part of a kit for sale.

FIG. 6 is an exploded view of the float molded float 50 with the plastic insert 1 of FIGS. 2A-2B with stem 40 extended outward with eyelet 45 attached to a tether line 120 and attached to the hanger 150 of FIGS. 5A-5B, with separate peel and foldable phone ring kickstand 100 of FIG. 3A. All of the components in FIG. 6 can be part of a kit for sale.

The tether line 120 can be a nylon cord, or a stainless steel wire line, and the like. The end of the tether line can include hook ends.

The float 50 buoy can have an illuminated red face with slanted white line for aiding in visibility when the float is in water.

The float buoy 50 can have a molded flag surface thereon. The float buoy 50 can be colored, such as red, orange, and the like for increased visibility.

Figure 7A:
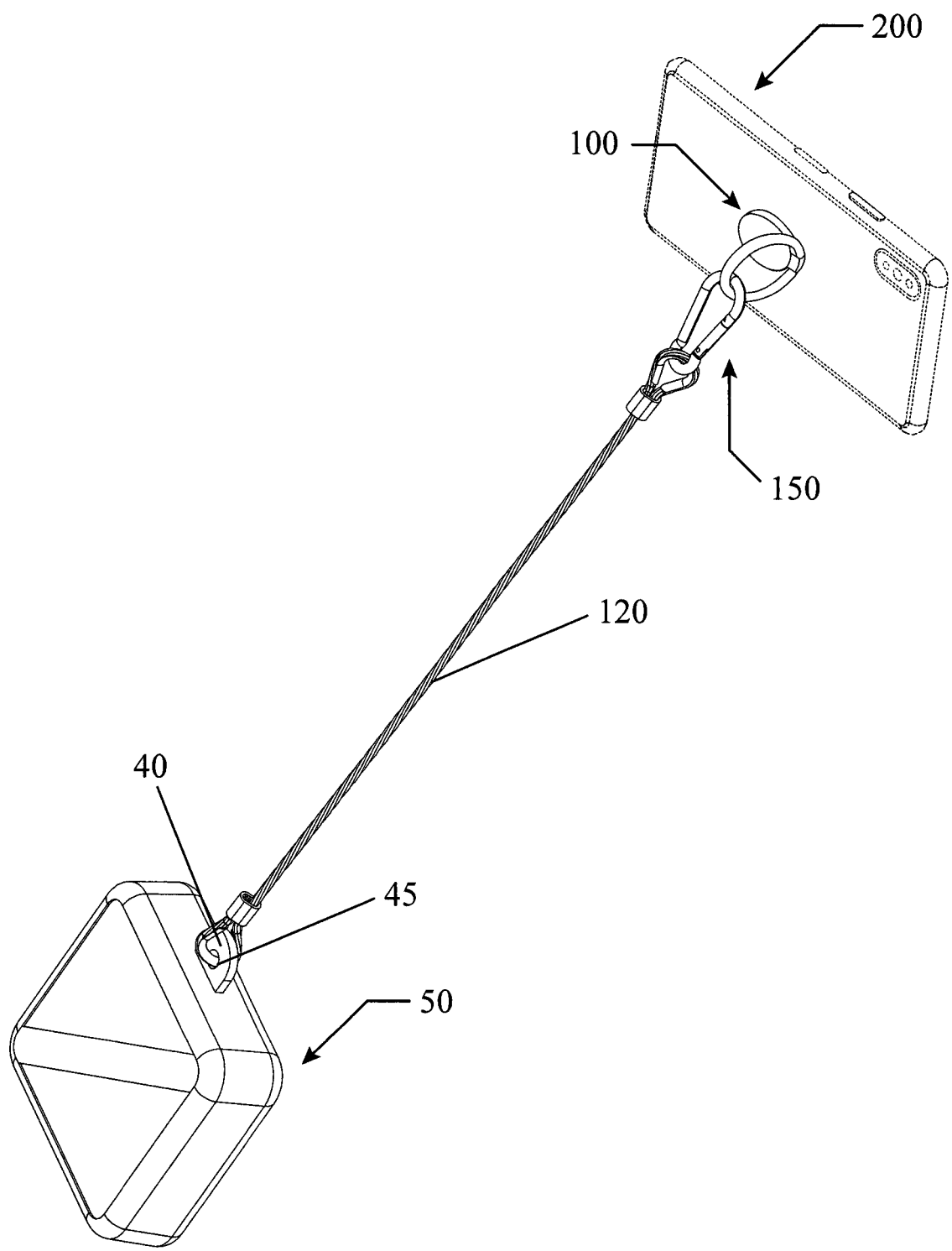
FIG. 7A is an assembled perspective view of the molded float with plastic insert of FIGS. 2A, 2B, 6 tethered to a portable mobile phone having the foldable ring kickstand of FIG. 3A adhered thereon.

FIG. 7A is an assembled perspective view of the float 50 with molded plastic insert 1 of FIGS. 2A, 2B, 6 tethered to a portable mobile phone 200 having the foldable ring kickstand 150 of FIG. 3A adhered thereon.

Figure 7B:
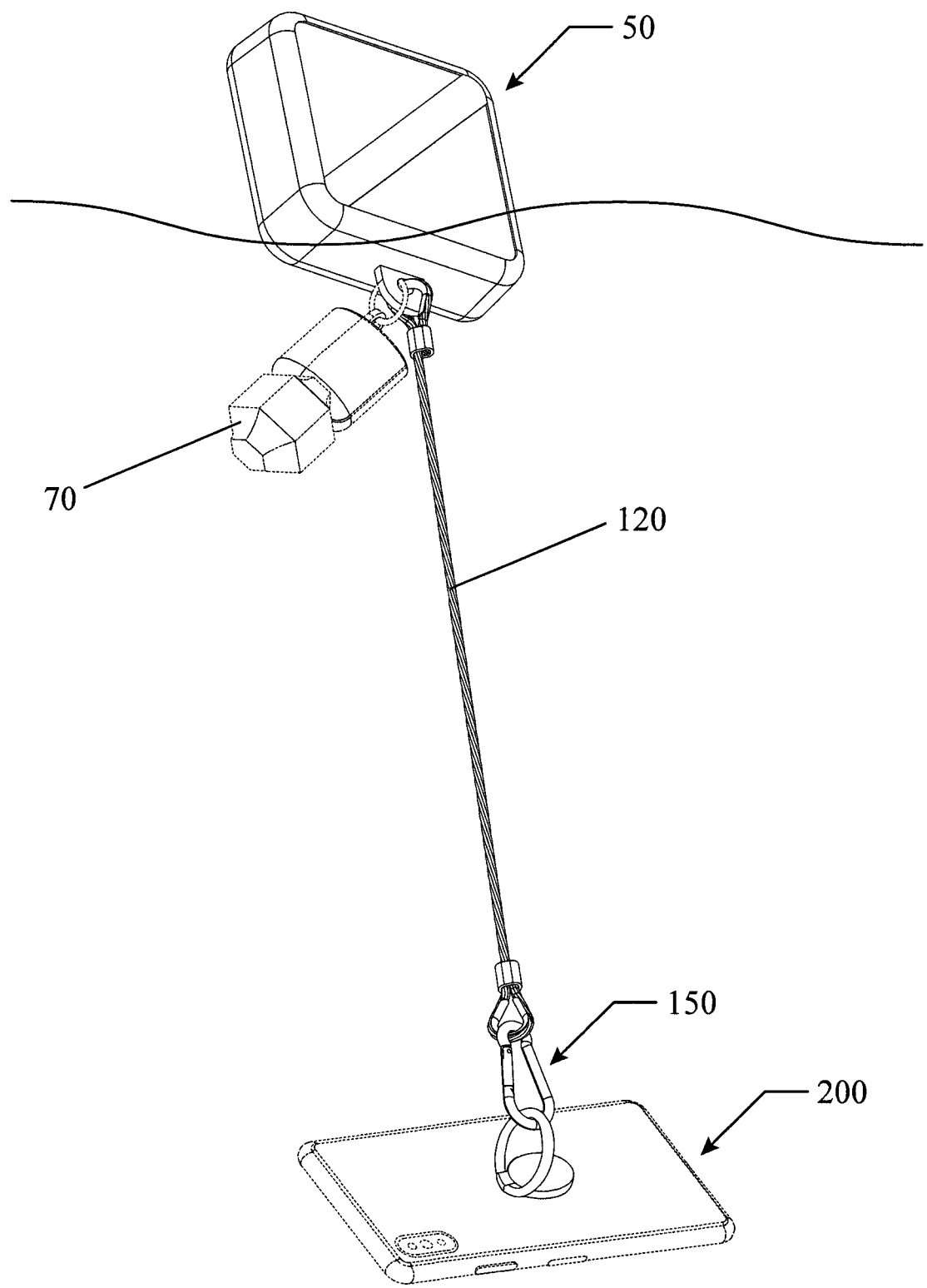
FIG. 7B shows the assembled components of FIG. 7A floating in the water.

FIG. 7B shows the assembled components 50, 120, 150, 200 of FIG. 7A floating in the water with the float 50 supporting the portable phone 200 from sinking in the water.

A small underwater fishing lure light 70, can also be attached to either the eyelet 45 and/or the line 120. The light 70 can include but is not limited to a small battery powered fishing lure light, and the like. The light 70 will assist in finding the float 50 and line 120 in the dark.

Figure 8A:
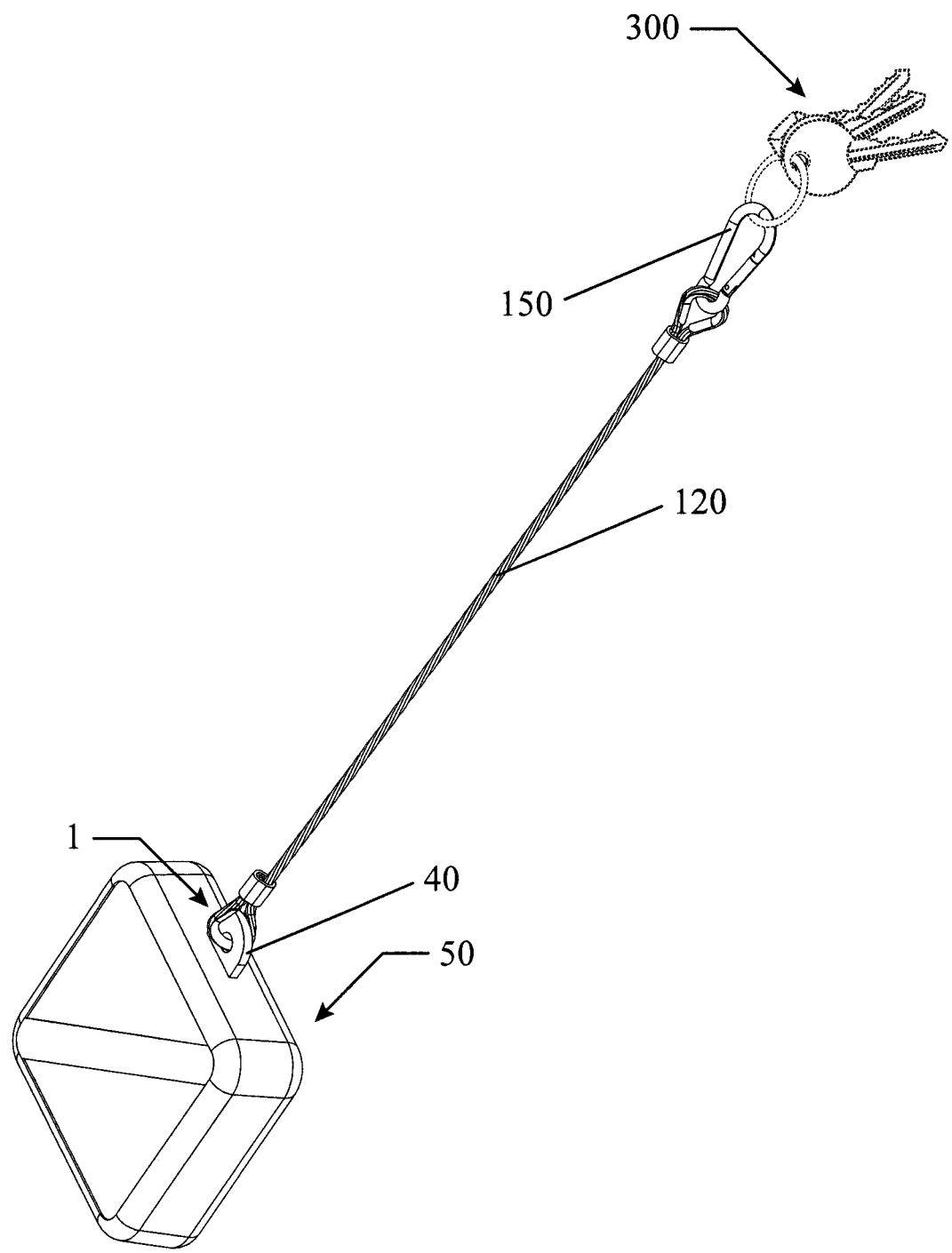
FIG. 8A is an application of the assembled perspective view of the molded float with plastic insert of FIGS. 2A, 2B, 6 tethered to a set of keys.
Figure 8B:
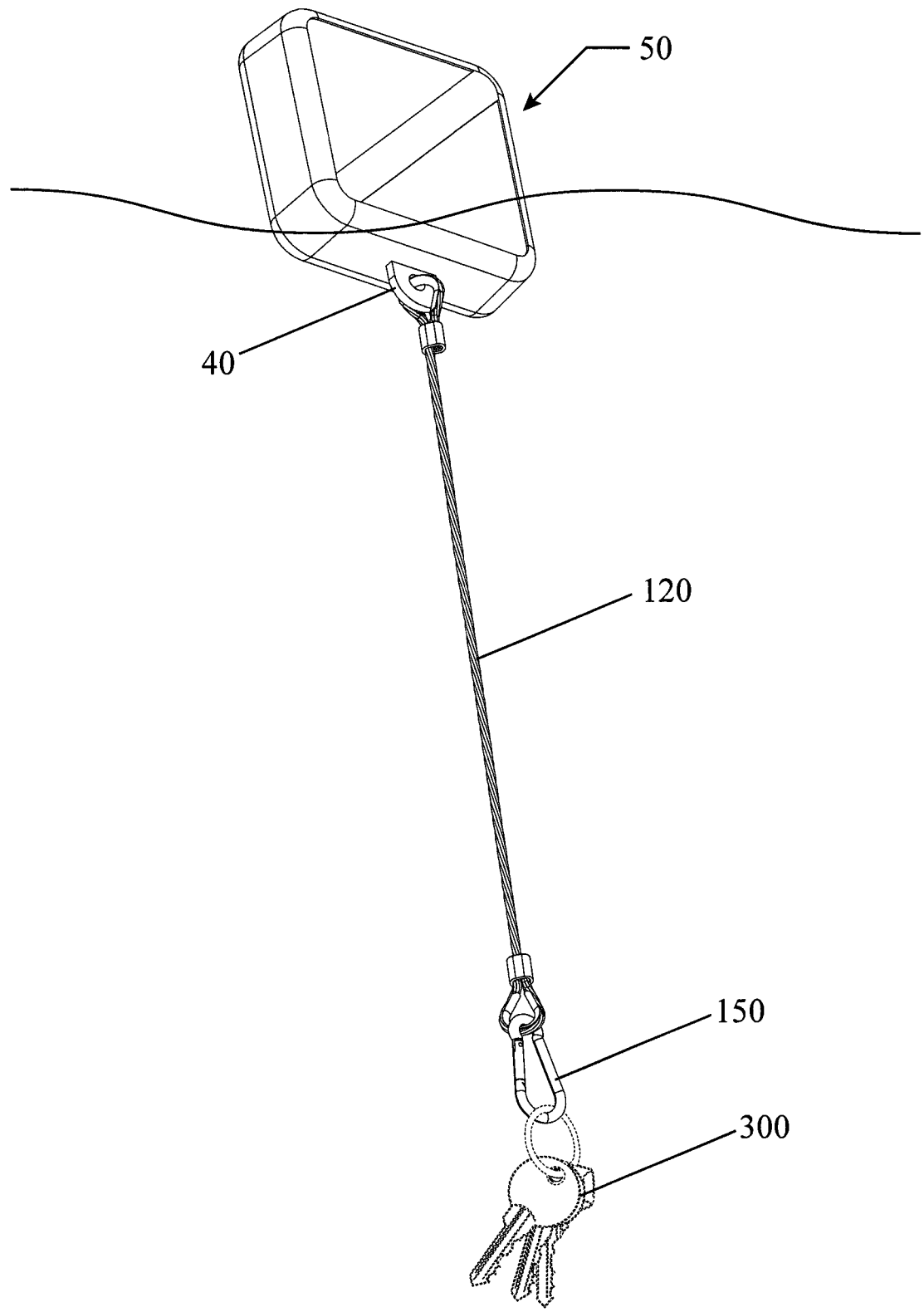
FIG. 8B shows a perspective view of the assembled components of FIG. 8A with the float in water tethered to keys attached to the tether by the hanger of FIG. 5A.

FIG. 8A is an application of the assembled perspective view of the molded float 50 with plastic insert 1 of FIGS. 2A, 2B, 6 tethered to a set of keys 300. FIG. 8B shows a perspective view of the assembled components 50, 120, 150 of FIG. 8A with the float 50 in water tethered to keys 300 attached to the tether 120 by the hanger of FIG. 5A.

Figure 9:
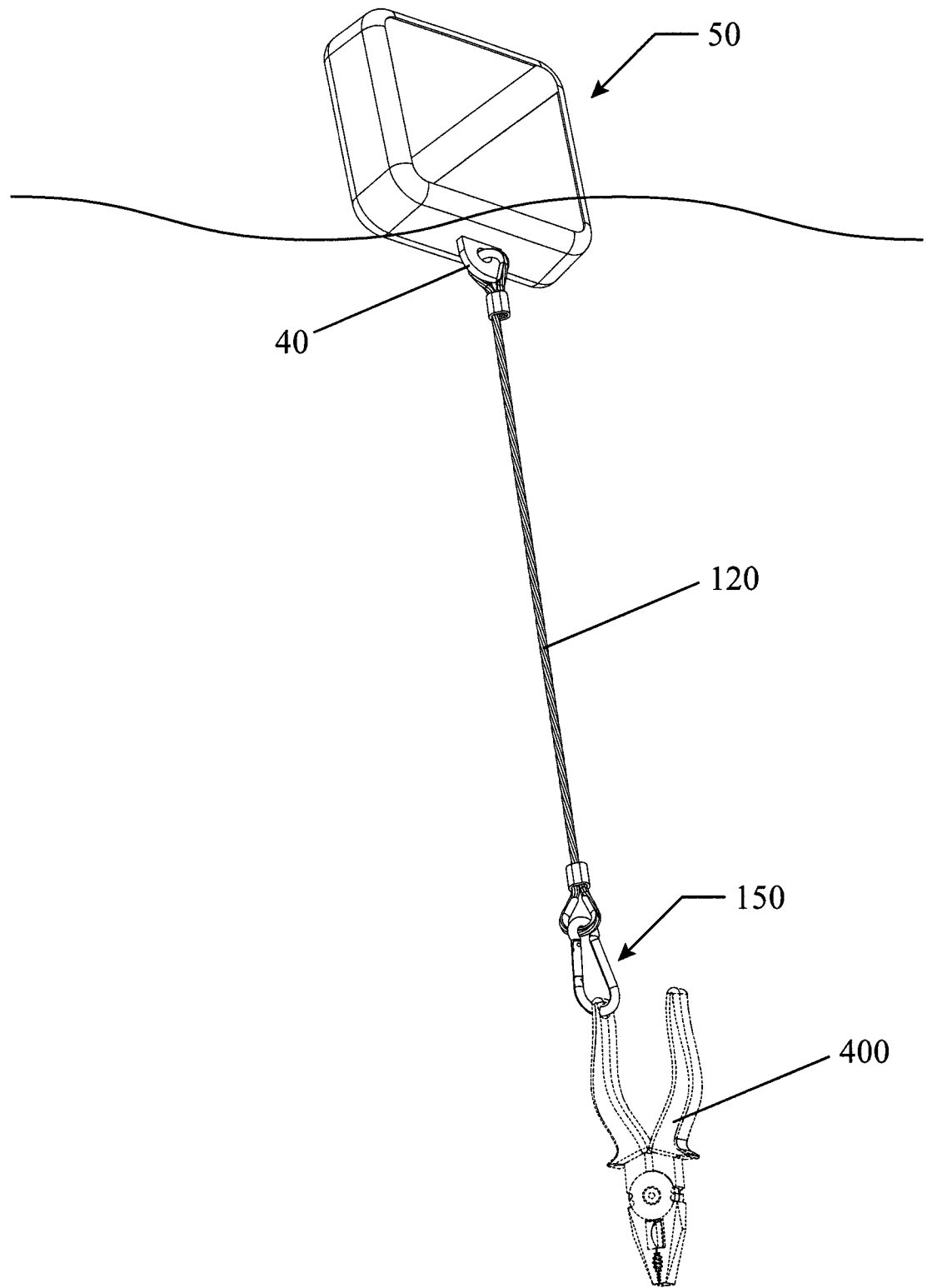
FIG. 9 shows a perspective view of the assembled components of FIG. 7A with the float in water tethered to fishing pliers.

FIG. 9 shows a perspective view of the assembled components 50, 120, 150 of FIG. 7A with the float 50 in water tethered to fishing pliers 400.

Figure 10A:
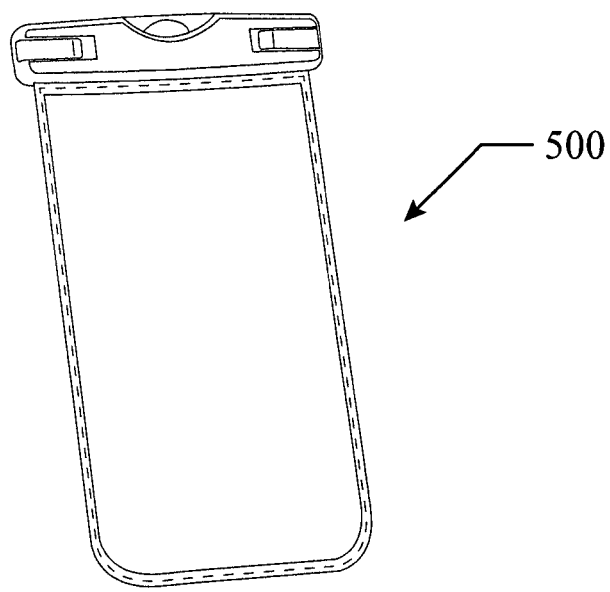
FIG. 10A is a side view of dry bag with removable top attached thereon.
Figure 10B:
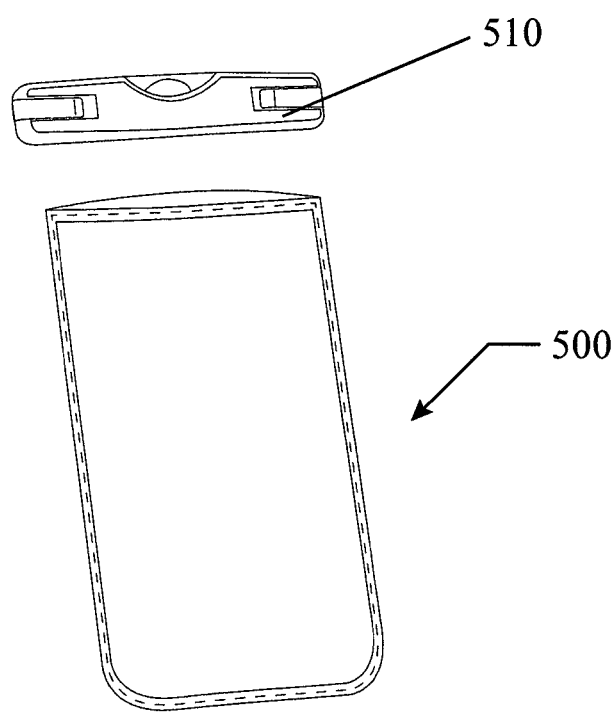
FIG. 10B is another side view of the dry bag of FIG. 10A with top removed.

FIG. 10A is a side view of dry bag 500 with removable top 510 attached thereon. FIG. 10B is another side view of the dry bag 500 of FIG. 10A with top 510 removed.

Referring to FIGS. 10A-10B, the dry bag 500 is a flexible container seals in a watertight manner to protect items, such as but not limited to electronics, clothing, and any other packable items from getting wet from being submerged in water.

Figures 11, 12:
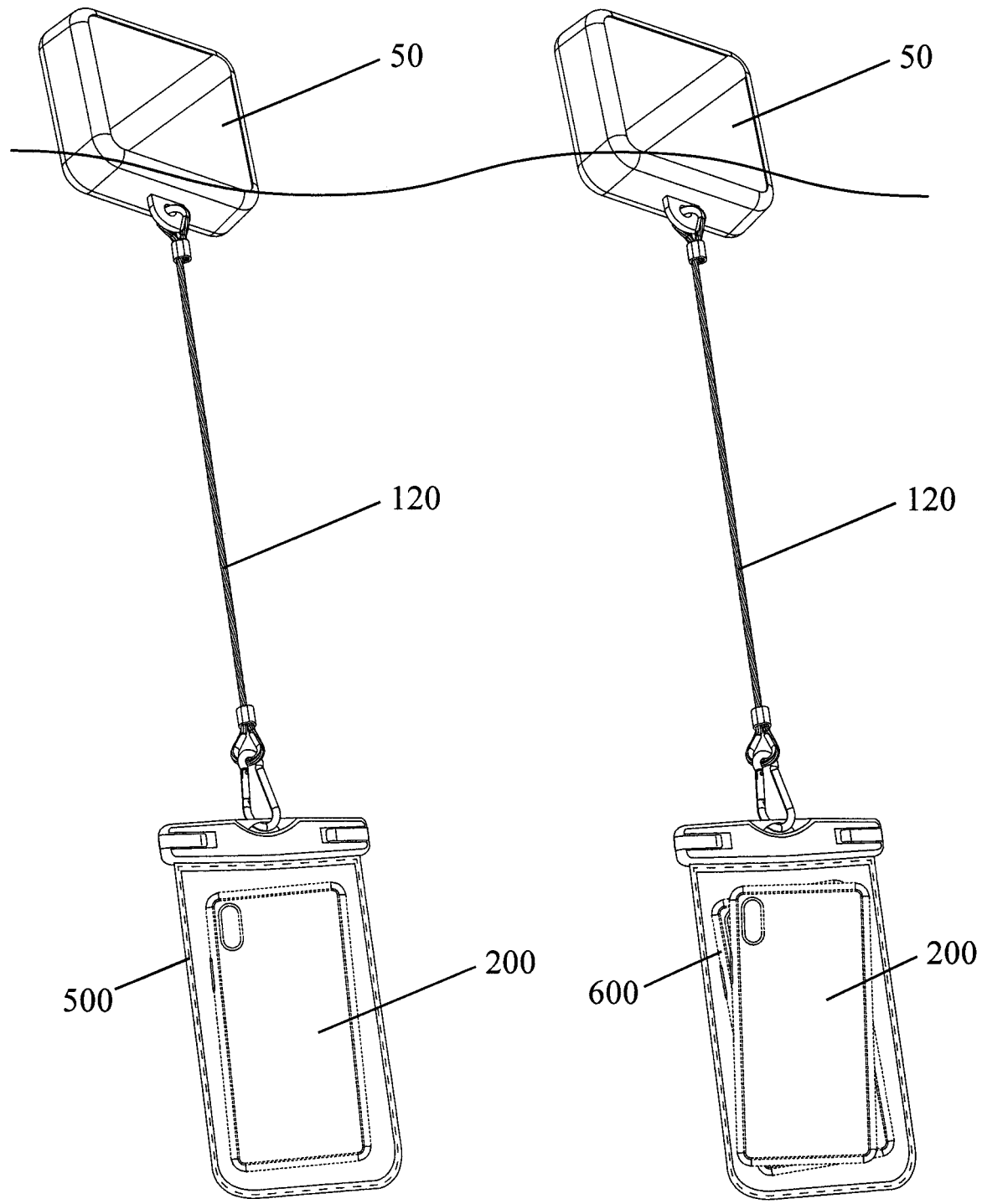
FIG. 11 shows the assembled components of FIG. 7A floating in water attached to the dry bag of FIGS. 10A-10B with a portable phone inside.
FIG. 12 shows the assembled components of FIG. 7A floating in water attached to the dry bag of FIGS. 10A-10B with a portable phone inside and wallet/billfold inside.

FIG. 11 shows the assembled components 50, 120, of FIG. 7A floating in water attached to the dry bag 500 of FIGS. 10A-10B with a portable phone 200 inside.

FIG. 12 shows the assembled components 50, 120 of FIG. 7A floating in water attached to the dry bag 500 of FIGS. 10A-10B with a portable phone inside 200 and wallet/billfold 600 inside.

Figure 13:
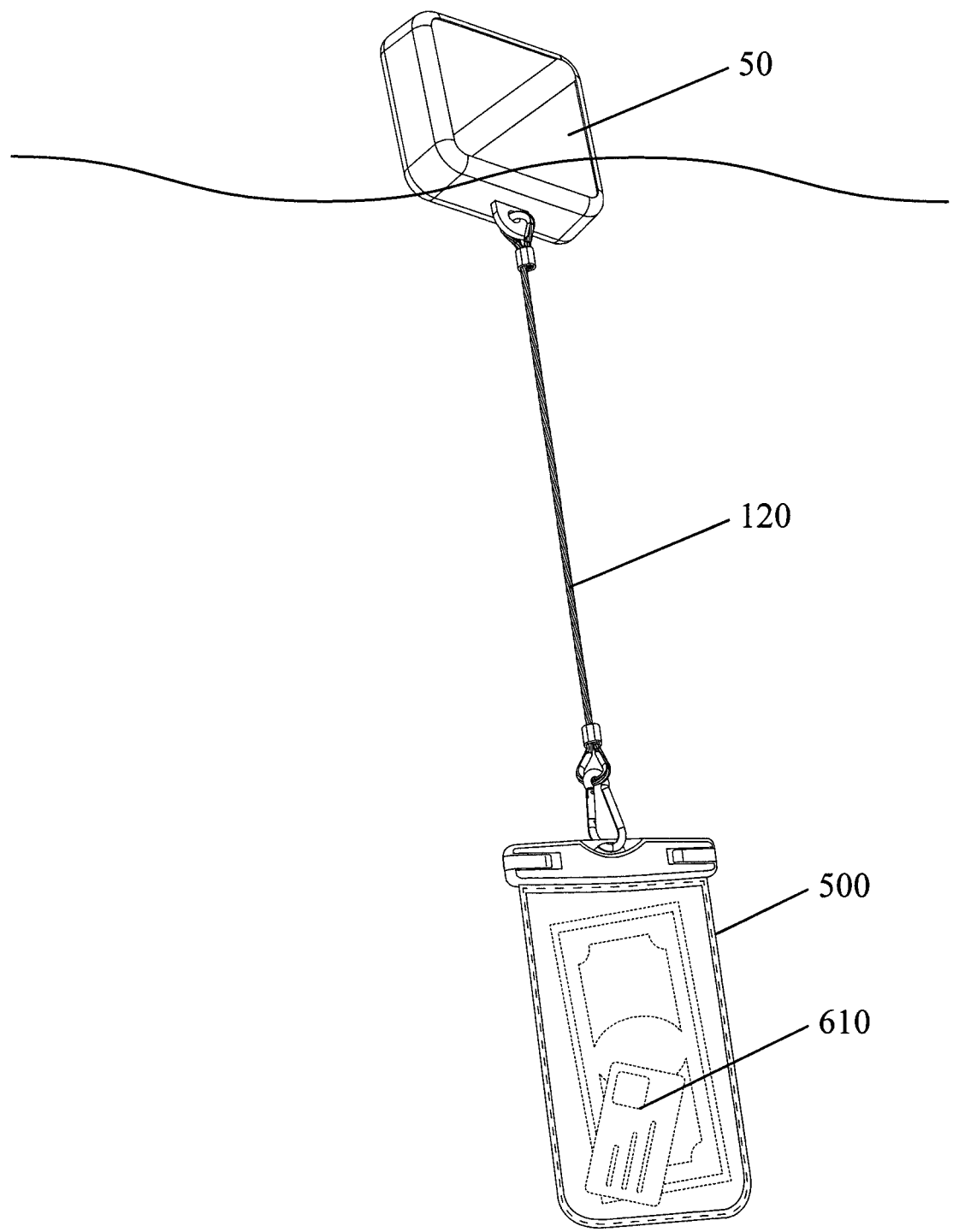
FIG. 13 shows the assembled components of FIG. 7A floating in water attached to the dry bag of FIGS. 10A-10B with money and credit card/driver's license and/or money inside.

FIG. 13 shows the assembled components of FIG. 7A floating in water attached to the dry bag 500 of FIGS. 10A-10B with credit card/driver's license 610 and/or money 620 inside.

The float buoy 50 has been tested to be able to easily support up to approximately ¾ of a pound from sinking in the water, which is buoyant enough to support most portable smart phones which do not weigh more than approximately 320 grams.

The invention can be sold and assembled in a kit form that includes the float buoy, tether line and phone attachment with peelable layer. The kit can include the combination of the float buoy with the line, and a dry bag with or without the phone attachment ring, with or without the fishing lure light. Tackle shops can sell the kits to customers, such as fishermen and the like.

The term "approximately"/"approximate" can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A universal flotation device, comprising:
   a float formed from a foam block having
   a solid T shaped insert with an eyelet protruding therefrom, the solid insert being molded inside of the foam block; and
   a tether line having a first end attached to the float and a second end for attaching the tether line to an object, wherein the floatation device prevents the object from sinking in water.

2. The universal flotation device of claim 1, wherein the tether line includes:
   a nylon cord.

3. The universal flotation device of claim 1, wherein the tether line includes:
   a stainless steel line.

4. The universal floatation device of claim 1, wherein the object is: a phone.

5. The universal floatation device of claim 1, wherein the object are keys.

6. The universal floatation device of claim 1, further comprising:
   a foldable ring attachment with a peel and stick layer that covers an adhesive surface, the adhesive surface being attachable to the object.

7. The universal floatation device of claim 1, wherein the foam block is formed from EVA plastic, and includes dimensions of approximately 3.5" by approximately 3.75" by approximately 1.25".

8. The universal floatation device of claim 1, wherein the object includes further comprising:
   a battery powered fishing lure, for being attached to the float or the line.

9. The universal floatation device of claim 1, wherein the solid T shaped insert includes:
   a left wing having upwardly and downwardly extending edges; and
   a right wing having upwardly and downwardly extending edges; and
   a stem protruding sideways from a middle portion between the left wing and the right wing having an end with an eyelet opening.

10. The universal floatation device of claim 9, wherein the T shaped insert further comprises:
    an upper flange extending upward from the middle portion between the left wing and the right wing; and a lower flange extending downward from the middle portion between the left wing and the right wing.

11. The universal floatation device of claim 4, further comprising:
a foldable ring kickstand having a peel and stick backing for allowing the foldable ring kick stand to be attached to the phone, the foldable ring kickstand being capable of being attached to the tether line.

12. A universal flotation system, comprising:
a float that includes a foam block and a solid T shaped insert with an eyelet protruding therefrom, the solid insert being molded inside of the foam block; and
a tether line having a first end attached to the float and a second end for attaching the tether line to an object, wherein the floatation device prevents the object from sinking in water.

13. The universal floatation system of claim 12, wherein the solid T shaped insert includes:

a left wing having upwardly and downwardly extending edges; and
a right wing having upwardly and downwardly extending edges; and
a stem protruding sideways from a middle portion between the left wing and the right wing having an end with an eyelet opening.

14. The universal floatation system of claim 13, wherein the T shaped insert further comprises:
an upper flange extending upward from the middle portion between the left wing and the right wing; and
a lower flange extending downward from the middle portion between the left wing and the right wing.

15. The universal floatation system of claim 12, wherein the object is: a phone.

16. The universal floatation device of claim 12, wherein the object are keys.

* * * * *